United States Patent

Conrad et al.

Patent Number: 5,427,020
Date of Patent: Jun. 27, 1995

[54] FINGER-PROTECTION DEVICE FOR A ROLLER GAP

[75] Inventors: Hans-Rolf Conrad, Dormagen; Horst Castner, Gütersloh, both of Germany

[73] Assignee: Sulzer Papertec Krefeld GmbH, Krefeld, Germany

[21] Appl. No.: 253,109

[22] Filed: Jun. 2, 1994

[30] Foreign Application Priority Data

Jun. 5, 1993 [DE] Germany .......... 43 18 773.0

[51] Int. Cl.⁶ .................. B30B 3/04; D21G 5/00
[52] U.S. Cl. ........................ 100/53; 100/173
[58] Field of Search .......... 100/53, 102, 161, 166, 100/173; 68/264, 265

[56] References Cited

U.S. PATENT DOCUMENTS

| | | | |
|---|---|---|---|
| 3,665,846 | 5/1972 | Schlunke | 100/53 X |
| 4,148,597 | 4/1979 | Larsen | 100/48 X |
| 4,867,055 | 9/1989 | Hütter et al. | 100/173 |
| 5,241,903 | 9/1993 | Lampic | 100/53 |

FOREIGN PATENT DOCUMENTS 4030150  3/1992  Germany .

OTHER PUBLICATIONS

Faserglas (fiberglass) in Lexicon der Technik, Lueger, vol. 3, pp. 206–207, 1961, which specifically disclosed "kunstharzgebundene Glas faserplatten" (artificial-resin bonded fiberglass-plates) on p. 207, col. 2.

Primary Examiner—Stephen F. Gerrity
Attorney, Agent, or Firm—Darby & Darby

[57] ABSTRACT

A finger-protection device for a roller gap of a paper-calender with heated rollers has a hollow body (4) extending along the roller gap, with a front wall (5) facing a roller (3), defining the roller gap, a dome shaped rear wall (6), and two end walls (8). The strips (9, 10) forming the longitudinal edges of the front and rear walls are at an angular position in relation to the front and rear walls (5, 6) and are directed to the rollers (2, 3) limiting the roller gap. They provide a maximum distance (d) from the rollers (2, 3), which does not permit the passing through of one's fingers between a longitudinal edge and the adjacent roller (2, 3). The hollow body (4) is supported at its ends and can be adjusted relative to the rollers (2, 3). In order to simplify the manufacture and operational handling of the finger-protection device (1, 2) and also maintain a non-exceedable maximum distance (d) to the rollers during the operation, the hollow body (4) consists of fiber-reinforced synthetic resin plastic. The front and rear walls (5, 6) are made as separate units and connected to each other. The strips are formed by front and rear walls (5, 6) as a one piece construction and as flanges (9a, 9b; 10a, 10b) connected to each other. The end walls (8) are produced separately and connected to the front and rear walls (5, 6) or are produced as a one-piece unit with one of the front and rear walls.

8 Claims, 2 Drawing Sheets

FINGER-PROTECTION DEVICE FOR A ROLLER GAP

FIELD OF THE INVENTION

This invention relates to a finger-protection device for a roller gap, particularly in a calender with heated rollers, formed by a hollow body which extends along the roller gap. It consists of a front wall facing a roller which limits the roller gap, and a dome shaped rear wall along a longitudinal axis of the hollow body, as well as two end walls. The strips forming the longitudinal edges of the front and rear walls are directed respectively to one and the other rollers, defining the roller gap and each in an angular position in relation to the front and rear walls. They are positioned at a predetermined maximum distance from the rollers which does not permit the passing through of one's fingers between a longitudinal edge and the adjacent roller, and the hollow body is supported at the end walls and adjustable relative to the rollers.

BACKGROUND OF THE INVENTION

In a known finger-protection device of this kind (DE-40 30 150 C1), the hollow body consists of metal and therefore is very heavy, making it necessary for it to be movably supported by a motor-generated force in order to change rollers. The hollow bodies will be correspondingly longer and heavier with longer rollers. There is a danger that because of its substantial weight and/or temperature-variations (particularly with heated rollers), a large deflection could occur and at times the safe allowable maximum distance (8 mm with calenders) will be exceeded. Additionally, the resonant-frequency of the hollow body is often in the range of the operating rotational speed of the rollers. The hollow body has a tendency to have resonant vibrations which could even lead to a contact with the rollers. Finally the manufacture of such a metal hollow body is very expensive.

SUMMARY OF THE INVENTION

The underlying object of this invention is to provide a finger-protection device of the earlier discussed form, which maintains the non-exceedable maximum distance to the rollers during the operation, and which can be manufactured and operated in a simple way.

This task is solved according to the present invention by making the hollow body from fiber-reinforced synthetic resin plastic with the front and rear walls made as separate units connected to each other. Strips are formed by front and rear walls as a one piece construction having connected flanges. The end walls are produced separately and connected to the front and rear walls or are produced in a one-piece construction with the front or rear wall.

Due to the properties of the fiber-reinforced synthetic resin plastic, which is a fiber binding material, the hollow body weighs substantially less, is deflection-resistant, and also has a much smaller heat-expansion coefficient when compared to a metal made hollow body. There is no tendency to deflect due to its weight and/or temperature-variations. Its resonant frequency is much higher than the operating frequency of the rollers and therefore it is not subject to resonant vibrations. Due to its lower weight, it can also be operated manually with ease. It is very simple to mold it under application of pressure, e.g. by compressing the forming-dies or by injection-molding. These methods make it possible to produce the side walls separately and subsequently connect them with the front and rear walls and also has the advantage that the front and rear walls can be produced in very large lengths and then can be trimmed to the desired lengths. In a one-piece design of the end walls with the front or rear wall, a subsequent connecting of the end walls with the front or rear wall is omitted. Nevertheless, due to the separating interface of both walls between the flanges, an easy removal of the molded walls from the mold will be possible.

The fibers can be high strength fibers, preferably carbon fibers, textile fiber-glass, synthetic fibers, or a mixture of all these fibers. These fibers provide the hollow body with very high strength and have a very low heat-expansion. For the synthetic resin plastic epoxy resins are preferred.

The connecting of the hollow body elements can be done with adhesives. Additionally, or instead, a connection by use of screws or rivets is possible, particularly in the flange-region.

A metal-plate can be embedded in the end walls, with an attached trunnion, as an option. The embedment could be simply formed into the end wall during the manufacturing process or subsequently attached by an over-lamination of a pre-fabricated layer of the end walls.

A provision can be made such that each trunnion is releasably clamped in a cross-eye on a fixed stand having a horizontal bar, which is at a right angle to the rollers. Such a cross-eye is a simple building element which makes it possible to set the hollow body to a desired distance to the rollers after loosening the clamps.

BRIEF DESCRIPTION OF THE DRAWINGS

The invention and its further development is illustrated by the following drawings of a preferred design example wherein.

DETAILED DESCRIPTION OF THE INVENTION

Figure 1:
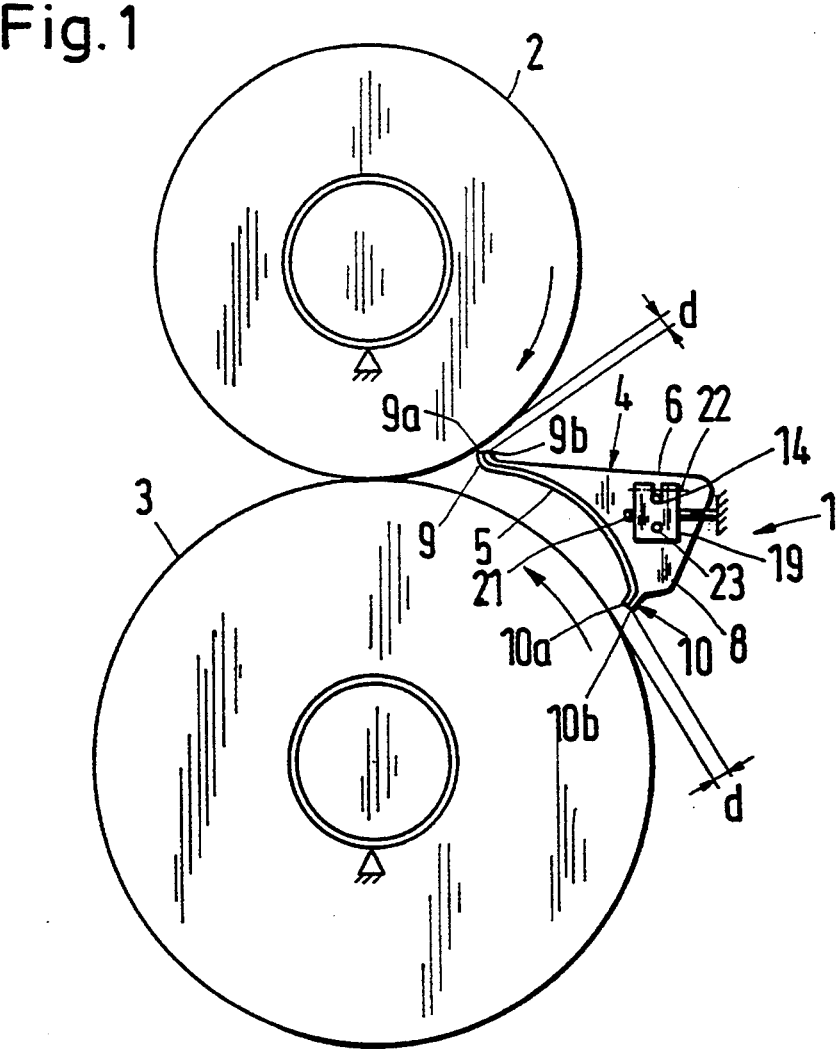
FIG. 1 is a schematic side-view of two rollers of a paper-calender and the finger-protection device.

The finger-protection device 1 in accordance with FIG. 1 to FIG. 4 is arranged on the inlet side of a roller gap between two heated rollers of a paper-calender and prevents an operator from touching the roller gap. For this purpose, there is a maximum allowable distance "d" of only 8 mm between the finger-protection device 1 and rollers 2, 3.

The finger-protection device 1 has a hollow body 4, which extends over the entire length of the rollers 2, 3 with a front wall 5 facing the roller gap and a dome shaped rear wall 6 along a longitudinal axis of the hollow body 4, as well as two end walls 7 and 8. The strips 9, 10 forming the longitudinal edges of the front and rear walls 5, 6 can be placed in an angular position in relation to the front and rear walls 5, 6 and directed to the rollers 2, 3 defining the roller gap. The hollow body consists of fiber-reinforced synthetic resin plastic, where the fibers are preferably carbon fibers. Alternatively or additionally, textile fiber-glass can be provided. The front and rear walls 5,6 are produced as separate units and are glued together. The strips 9,10 are formed in one-piece with front and rear walls 5, 6 and glued to flanges 9a, 9b and 10a, 10b. The end walls can be produced as separate units and glued to front and rear walls 5, 6 or as one-piece units with front or rear wall 5, 6. The flanges 9a, 9b and 10a, 10b can alternatively or additionally be connected by use of screws or rivets.

Figure 2:
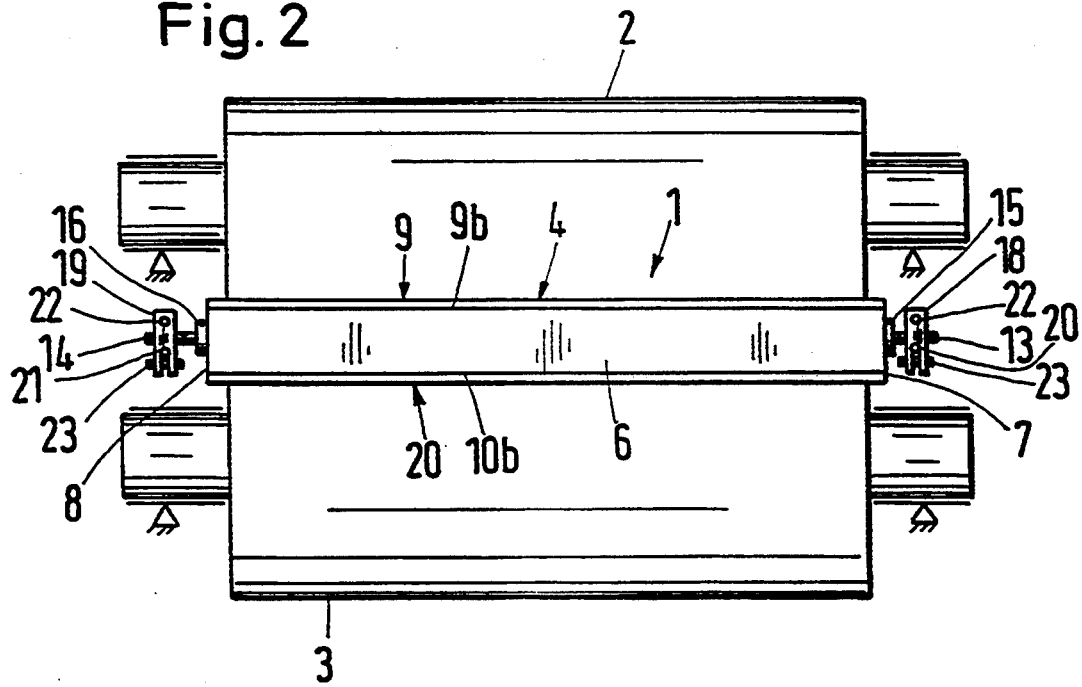
FIG. 2 is a front-view of the rollers and the finger-protection device according to FIG. 1.
Figure 3:
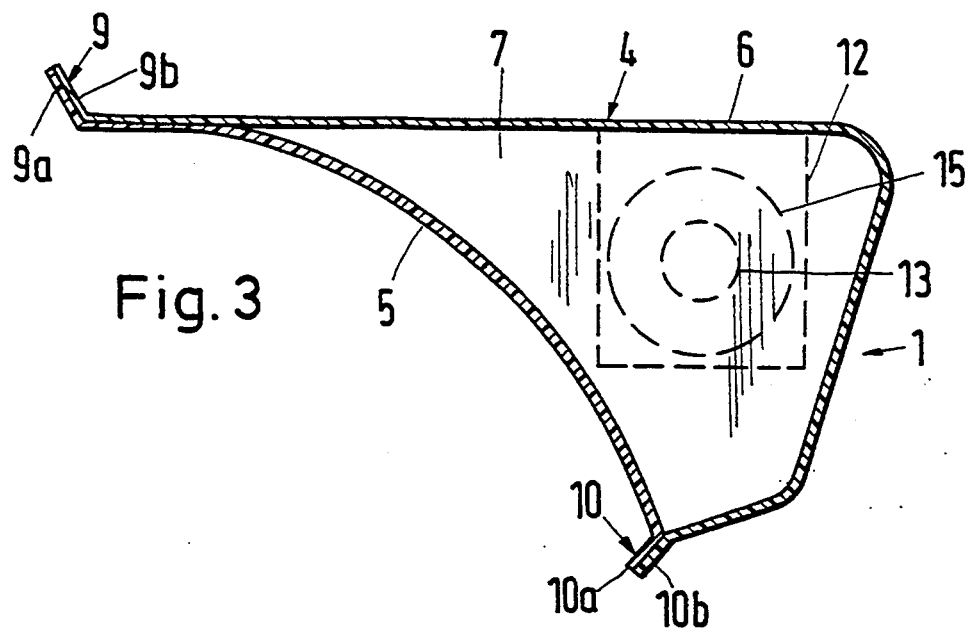
FIG. 3 is an enlarged cross-section through the finger-protection device according to FIG. 1 and FIG. 2.
Figure 4:
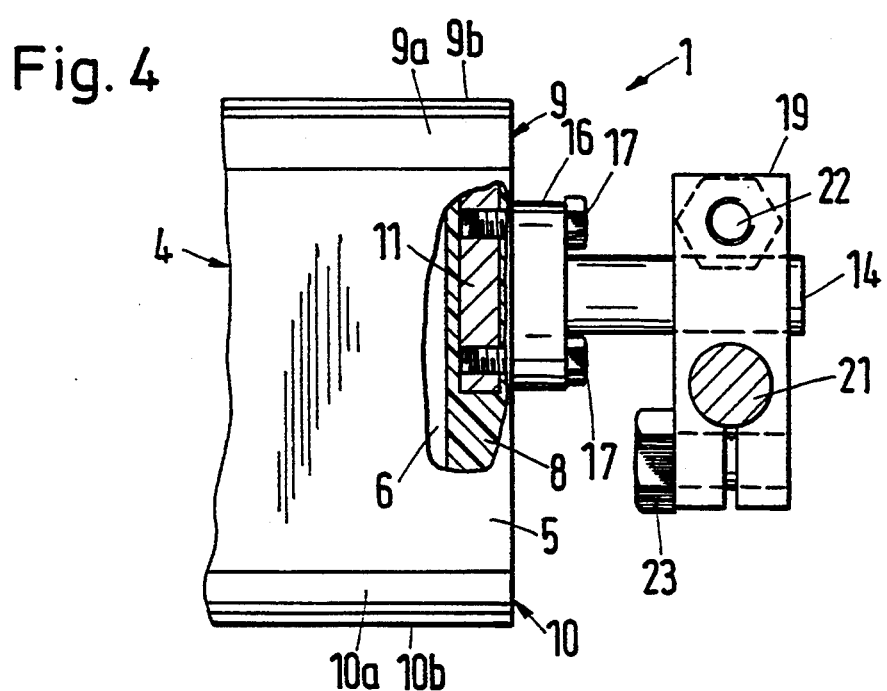
FIG. 4 is a partially broken out view of one end of the finger-protection device seen from the left side in FIG. 3.

A metal-plate 11, 12 can be embedded in the end walls 7, 8, the plate having a trunnion 13, 14 attached to a plate 15, 16 secured on the outer surface of the end walls 7, 8 by screws 17 (not shown in FIG. 2)

Each trunnion 13, 14 is clamped tightly by screws 22, 23 in a cross-clamp 18, 19 to a fixed stand having a horizontal bar 20, 21, but can be released from the clamping slots.

Figure 5:
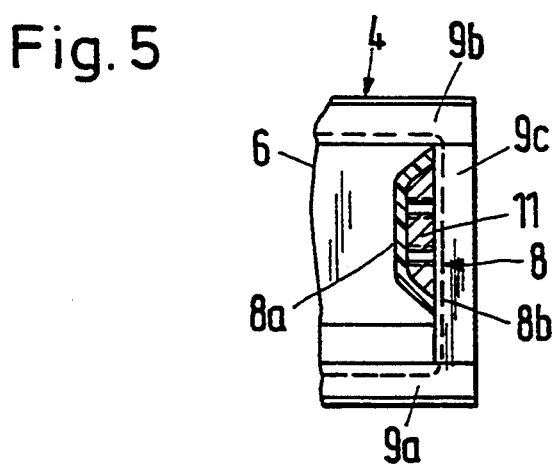
FIG. 5 is a front-view of a slightly modified rear wall of the finger-protection device of the invention, partially in section.

With the version shown in FIG. 5 every end wall (only end wall 8 is shown) has the metal plate 11 (12) fastened at the inside of a pre-fabricated outer end wall element 8b through an over-lamination 8a, which forms an inner end wall element.

For a design example of the finger-protection device, which is 5 m long and used for heated rollers with surface temperatures up to 170° C., the following data were reported:

| | |
|---|---|
| Weight (without trunnions) (compared to: a prior high-grade steel angle of approx. 130 kg) 65% carbon fiber, density 1.7 kg/dm$^3$, 35% epoxy plastic resin, density 1.1 kg/dm$^3$, wall-thickness approx. 5 mm | ca. 25 kg |
| deflection due to its weight | 2.5 mm |
| distortion through heat-expansion | ca. 2 to 3 mm |
| heat-expansion coefficient (1 to 4) × 10$^{-6}$ °K.$^{-1}$ (compared to: high-grade steel of 12 × 10$^{-6}$ °K.$^{-1}$) | |
| deviation from straightness during manufacture (depends on the accuracy of the dies and fixtures) | <1 mm |
| temperature resistance up to | 170° C. |
| characteristic frequency | >15 Hz |
| E-Module (axial direction) | 120000 N/mm$^2$ |

Such a finger-protection device has the advantage that it can be manufactured in a simple way and due to its low weight and small heat-expansion coefficient maintains the distance "d" from the rollers 2, 3 and can be handled with ease. This makes it possible to omit a motorized mechanism to remove the finger-protection device during an exchange of rollers in the calender, because it may be simply dissembled and removed by two operators loosening screws 23 and then removing the device by hand. In the reverse situation, it can just as easily be re-assembled and adjusted.

We claim:

1. A finger-protection device for a roller gap defined by two rollers, comprising:

a front wall facing one of the rollers when the device is positioned along the roller gap, a separate dome shaped rear wall positioned along a longitudinal axis of the roller gap, and two end walls for connecting said front and rear walls, said front, rear and two end walls forming a hollow body wherein said walls of said hollow body consist of fiber-reinforced synthetic resin plastic;

strips forming longitudinal edges of said front and rear walls at an angular position in relation to said front and rut walls and respectively directed to one and the other of said rollers in the position of the device along the roller gap; and said strips providing a predetermined maximum distance from said rollers in the position of the device along the roller gap, said distance not permitting the passing through of fingers between a longitudinal edge and the adjacent roller, and said hollow body is supported at the end walls and adjustable relative to the rollers, said strips are defined by said from and rear walls as a one piece construction and connected to each other as flanges.

2. The finger-protection device of claim 1, wherein the fibers of said fiber-reinforced synthetic resin plastic are selected from the group consisting of carbon fibers, textile fiber-glass, synthetic fibers, and combinations of said fibers.

3. The finger-protection device of claim 1, wherein said front and rear walls and said flanges are connected using glued connections.

4. The finger-protection device of claim 1, wherein a metal-plate is embedded in each of said end walls, with an attached trunnion.

5. The finger-protection device of claim 4, wherein each said trunnion is releasably cross-clamped on a fixed stand having a horizontal bar, said bar being at a right angle to said rollers.

6. The finger-protection device of claim 1, wherein each of said end walls is separately connected to said front and said rear walls.

7. The finger-protection device of claim 1, wherein said end walls are formed in a one-piece construction with at least one of said front and rear walls.

8. The finger-protection device of claim 1, wherein the resonant frequency of said fiber-reinforced synthetic resin plastic hollow body is greater than the resonant frequency of the rollers during operation.

* * * * *

Adverse Decision In Interference

Patent No. 5,427,020, Rodney M. Richards, Theodore Jones, David L. Snitman, Gregory S. Brown, METHOD FOR REDUCING CARRYOVER CONTAMINATION IN AN AMPLIFICATION PROCEDURE, Interference No. 105,257, final judgment adverse to the patentees rendered June 10, 2005, as to claims 1, 2, and 19-21.

*(Official Gazette, November 22, 2005)*